No. 828,022. PATENTED AUG. 7, 1906.
S. A. DONNELLY.
TRUSS.
APPLICATION FILED JULY 25, 1904.
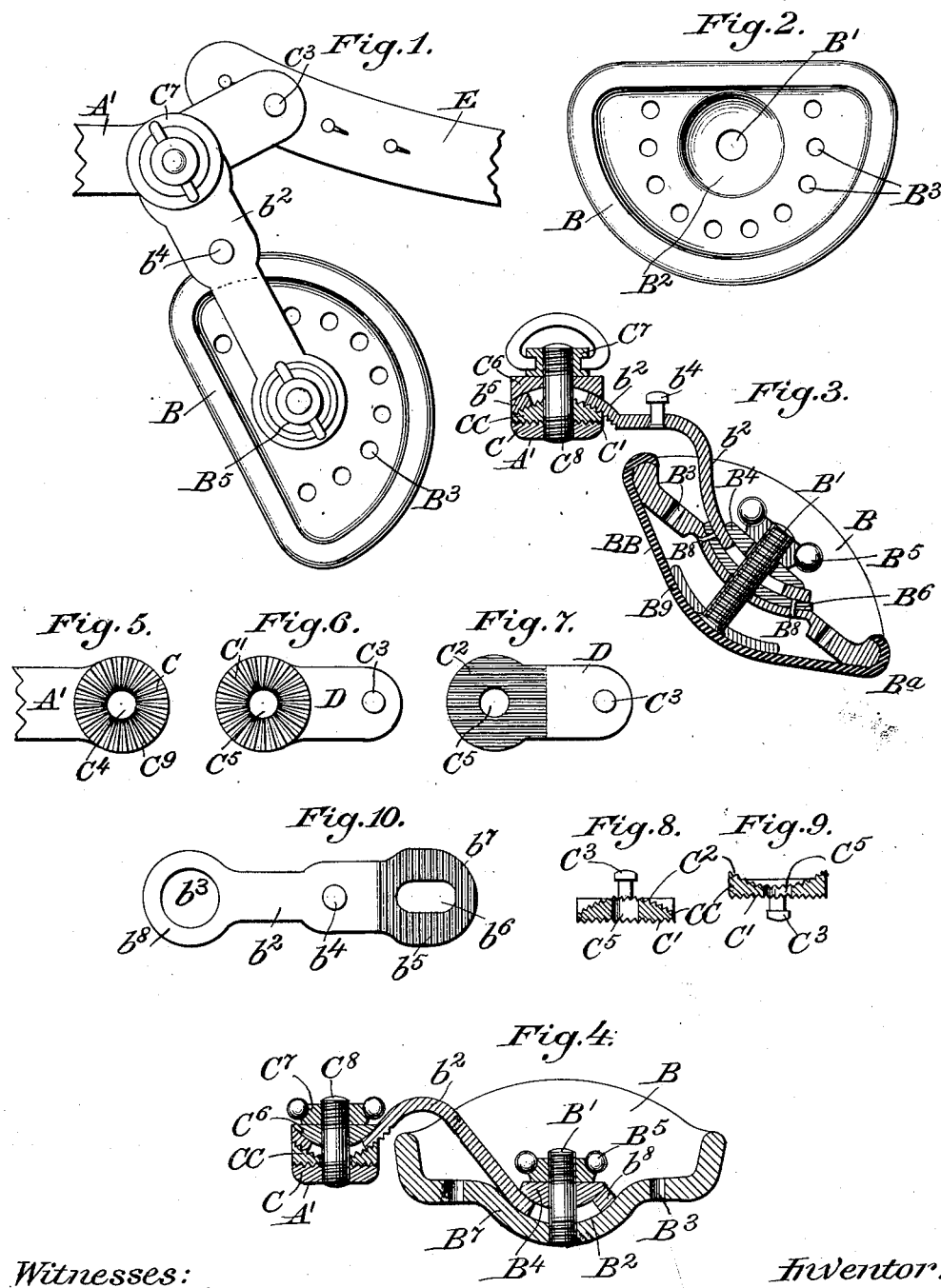
Witnesses:
Barbara Donnelly
Edward Donnelly
Inventor:
Samuel A. Donnelly

UNITED STATES PATENT OFFICE.

SAMUEL A. DONNELLY, OF CHICAGO, ILLINOIS.

TRUSS.

No. 828,022.　　　　Specification of Letters Patent.　　　Patented Aug. 7, 1906.

Application filed July 25, 1904. Serial No. 218,016.

*To all whom it may concern:*

Be it known that I, SAMUEL A. DONNELLY, a citizen of the United States, residing at Chicago, county of Cook, and State of Illinois, have invented a new and Improved Truss, of which the following is a specification.

My invention particularly relates to the treatment of hernia by the use of a truss having a large range of adjustment, positive holding devices, and a pad that properly holds a hernia, and that is cool, clean, and sanitary.

Although this truss is of the spring-truss order, it also can be made with a flexible belt, if desired. The pads of my truss can be made flexible or of cast or sheet metal, if desired, or both. I preferably use aluminium because of its non-corrosive, clean, and lasting qualities; but I also may use rubber or other material for my pads and other parts.

In the accompanying drawings, Figure 1 is a front view of part of my truss, showing my truss-pad. Fig. 2 is an inside view of my truss-pad. Fig. 3 is a sectional view of my truss-pad with the concave connections. Fig. 4 is another sectional view of my truss-pad with the convex connections. Fig. 5 is a side view of the end clip of my truss-spring with radiating notches. Fig. 6 is a view of the adjusting-washer, showing the radiating notches. Fig. 7 is a view of the adjusting-washer, showing the parallel notches. Fig. 8 is a sectional view of the adjusting-washer, showing it made convex. Fig. 9 is a sectional view of the adjusting-washer, showing it made concave. Fig. 10 is a bottom view of the adjusting-lever, showing the parallel notches.

The pad B, as can be seen on the different views Figs. 1, 2, 3, 4, is of a half-circular dish-shaped construction having one part of its edge straight, which conforms more nearly to fitting the groin where the most of the ruptures occur than other pads now made. This I consider the best shape for fitting and holding the general run of ruptures, as it conforms better between the abdomen and lower limbs. In the bottom of the dished pad is the rounded recess $B^2$, having the stud $B'$ for engaging the spoon-shaped end $b^3$ of the adjusting-lever $b^2$ by means of the washer $B^4$ and the thumb-nut $B^5$.

The spoon-shaped end $b^3$, has a hole sufficiently large as to permit the pad to be oscillated sufficiently as to be conformed and adjusted to the rupture and then secured by the thumb-nut $B^5$. The opposite end of the lever $b^2$ is secured to the end clip C of the spring $A'$ by means of the stud $C^8$, the adjusting-washer C C, the washer $C^6$, and the nut $C^7$. If desired, the stud-screw $C^8$ can be made into a thumb-screw and then the nut $C^7$ can be dispensed with.

The adjusting-lever $b^2$, it will be noticed, has a parallel notched end $b^5$. These parallel notches engage the parallel notches $C^2$ of the adjusting-washer C C. On the nut $C^7$ being unscrewed, the angle of the lever $b^2$ can be adjusted as to give it sufficient inward tension to the pad B against the rupture by either moving the lever $b^2$ backward or forward through the washers C C and $C^6$ and then by tightening the nut again the adjustment is positively secured. On the opposite side of the adjusting-washer C C are the radiating notches $C'$. These notches engage the radiating notches $C^9$ of the end C of the truss-spring $A'$.

On the nut $C^7$ being unscrewed, the lever $b^2$ can be moved in any lateral direction, so that the pad B can be adjusted to the rupture, and then on the nut $C^7$ being tightened the radiating notches mesh into each other, so as positively to secure the adjustment from any lateral movement; but, preferably, I contemplate that on the unscrewing of the nut $C^7$ the adjusting-lever be adjusted in any direction desired or until limited before the nut $C^7$ is again tightened up. These adjusting-washers, it will be seen, have a projecting part D, having thereon the stud-pin $C^3$, being for the purpose of allowing the strap E to be attached thereto either to the front or to the back of the said projecting part D by attaching the strap or band to the back of the projection D. It is more positively held in place by the down and outward pressure of the abdomen in holding the strap to the back of the projection D. Also as trusses have a tendency to move upward and away from the rupture, due to the action of the lower muscles and limbs working against the pad, I therefore have devised this projection D as a counter device in keeping the pad downward and in place by the downward pressure of the abdomen on the strap or band, said band or strap being held higher up than usual against the abdomen by the use of the projection D, therefore adding pressure in keeping the truss and pad downward and in place in holding the rupture; but these adjusting-washers C C can be made either with or without the projecting part D, and the strap E can then be connected to the stud $b^4$ on the adjusting-lever $b^2$. By referring to Figs. 8 and 9 it can be seen that the adjusting-washers C C can be either made concave or convex and the lever $b^2$ bent to conform to either kind of said washers. I do this for the reason that on a high-rimmed pad, such as shown on Fig. 4, it would be best to use a concave adjusting-washer, and on a low-rimmed pad, as shown on Fig. 3, a convex adjusting-washer, as it then allows more room between the lever and the rim of the pad. My truss may be made with either pad.

I have shown both kinds of washers and levers conforming to the same, as can be seen on Figs. 3, 4, 8, 9. Although I have not shown the washers C C made with radiating notches on both of its sides, they may be made so that the projection D may be lowered or raised independent of the spring-clip or adjustable lever, and although I have not shown the lever $b^2$ made having its end $b^5$ with the radiating notches it may be so notched, when it then will be ready to directly engage the radiating notches of the clip C of the spring A'. I also can dispense with the adjusting-washer C C when I do not desire an inward adjustment of my truss-pads. The pad B when made of such material as will not be of sufficient strength as to hold firmly the screw-stud B', I will then reinforce the pad by using the reinforcement $B^6$ in supporting the stud-screw B', and also in allowing more thread to surround the said stud-screw for the wear and extra strain that it will have to stand in making the different adjustments. As I further will use this stud-screw B', in conjunction with the flexible diaphragm B B, and the plug-pad $B^9$, (see Fig. 3,) as an adjustable plug for plugging up and holding ruptures of variable sizes, as this adjustment can be nicely made by either screwing inward or outward against the diaphragm the stud-screw B' from the pad B, (see Fig. 3,) I preferably use rubber for my diaphragm, and it is held in place on the pad by the flange $B^a$ contracting itself around the pad. The plug-pad may be an integral part of the stud-screw B' or it may be a separate part of said screw, as may be desired—such, for instance, as when it is made smaller in size it is best then to make it an integral part of said screw.

Where it may be undesirable, the diaphragm may be dispensed with. Also where it may be desirable to use a simple pad the pad B (shown on Fig. 4) may suffice for the cure of some ruptures. The peculiarity of this pad shown on Fig. 4 is that the plugging projection $B^7$ allows nicely for the dished adjusting-recess $B^2$ on its opposite side, thereby allowing a large range of adjustment of the pad, and also allows the thumb-screw to be set down in the pad and out of the way, so as not to catch on the underwear or make a lumpy appearance in the location of the rupture.

What I claim, and desire to secure by Letters Patent, is—

1. In a truss, a pad having an adjustable screw and a flexible diaphragm attached to its rim, and said screw being for the purpose of adjustment outward and inward of the diaphragm from the said pad and said screw having thereon a plug-pad for the purpose of shaping the diaphragm to plug a rupture, substantially as set forth.

2. The combination in a truss, of a pad having therein a reinforcement which engages a screw, and a lever having a dished or spoon-shaped end having an enlarged hole therein, said end and said screw passing through said enlarged hole, and said spoon-shaped end of the lever seated in the reinforcement for the purpose of adjustment and means for securing said adjustment, substantially as set forth.

3. In a truss, a truss-pad having secured therein a reinforcement, an adjustable screw having secured thereon a plug-pad, and said screw passing through and engaging the said reinforcement and the dished end of a lever having an enlarged hole engaging the adjustable screw and the reinforcement for the purpose of adjustment and means for securing said adjustment, substantially as set forth.

4. The combination in a truss-pad having therein a hole, and an adjustable screw having thereon a plug-pad passing through and engaging the said hole of the truss-pad and a lever attached to said truss-pad by means of the adjustable screw and said adjustable screw also being for the purpose of adjustment outward or inward of the plug-pad and means for securing said adjustment, substantially as set forth.

5. The combination in a truss of a lever having a parallel notched end and an adjustable washer having radiating notches on one side and parallel notches on the opposite side engaging the parallel notches of the lever and a truss-spring or clip thereof, having radiating notches which engage the radiating notches of the said adjustable washer for the purpose of adjustment and means for securing said adjustment, substantially as set forth.

6. In a truss, a lever having parallel notches crosswise on one of its ends and an adjustable washer having radiating notches on one side engaging a corresponding radiating notched clip and parallel notches on its opposite side which engage the parallel notches of the lever and said washers being made either convex or concave on the side of the said parallel notches, and the parallel notched end of the lever being made bent to correspond to the convex or concave sides of said washer, all for the purpose of adjustment and means for securing said adjustment, substantially as set forth.

7. In a truss an adjustable washer having a hole through its body portion and radiating notches on one side radiating from the said hole and parallel notches on its opposite side which said side is either made concave or convex and said washer being engaged between a clip and an adjustable lever for the purpose of adjustment, substantially as set forth.

8. In a truss, a washer having a body portion having a hole therein, and a projection extending off from the said body portion having a stud thereon for the purpose of attaching the strap or band thereto, and said washer being engaged between a lever and clip for the purpose of adjustment, substantially as set forth.

SAMUEL A. DONNELLY.

Witnesses:
ADOLPH YONDER,
FRANK HARTWIG.